No. 784,308. PATENTED MAR. 7, 1905.
G. DENGLER & I. W. SCHMIDT.
ELECTRIC MOTOR.
APPLICATION FILED SEPT. 12, 1904.

Witnesses
Inventors
George Dengler and
Ida W. Schmidt
By Frank S. Appleman
Attorney No. 784,308.

Patented March 7, 1905.

UNITED STATES PATENT OFFICE.

GEORGE DENGLER AND IDA W. SCHMIDT, OF DETROIT, MICHIGAN.

ELECTRIC MOTOR.

SPECIFICATION forming part of Letters Patent No. 784,308, dated March 7, 1905.

Application filed September 12, 1904. Serial No. 224,166.

*To all whom it may concern:*

Be it known that we, GEORGE DENGLER and IDA W. SCHMIDT, citizens of the United States of America, residing at Detroit, in the county of Wayne and State of Michigan, have invented certain new and useful Improvements in Electric Motors, of which the following is a specification.

This invention relates to electric motors, and particularly to a type thereunder known as "reciprocating" motors.

An object of this invention is to provide magnetic coils alternately energized and demagnetized and the provision of solenoids alternately reciprocated under the influences of the magnetic coils.

Furthermore, an object of this invention is to provide novel means for establishing electrical connections between the conductors to the coils, whereby the said coils are alternately electrically connected with the source of electricity; and the invention further contemplates the provision of means for utilizing the movement of the solenoids for converting rotary motion to the crank-shaft whereby a power-wheel is driven.

Furthermore, an object of this invention is to provide an electric motor of the class described comprising few inexpensive parts which are simple in construction and which will prove efficient and satisfactory in use and comparatively inexpensive to produce and maintain.

With the foregoing and other objects in view the invention consists in the details of construction and in the arrangement and combination of parts to be hereinafter more fully set forth and specifically claimed.

In describing the invention in detail reference will be had to the accompanying drawings, forming part of this specification, wherein like characters denote corresponding parts in the several views, in which—

Figure 1:
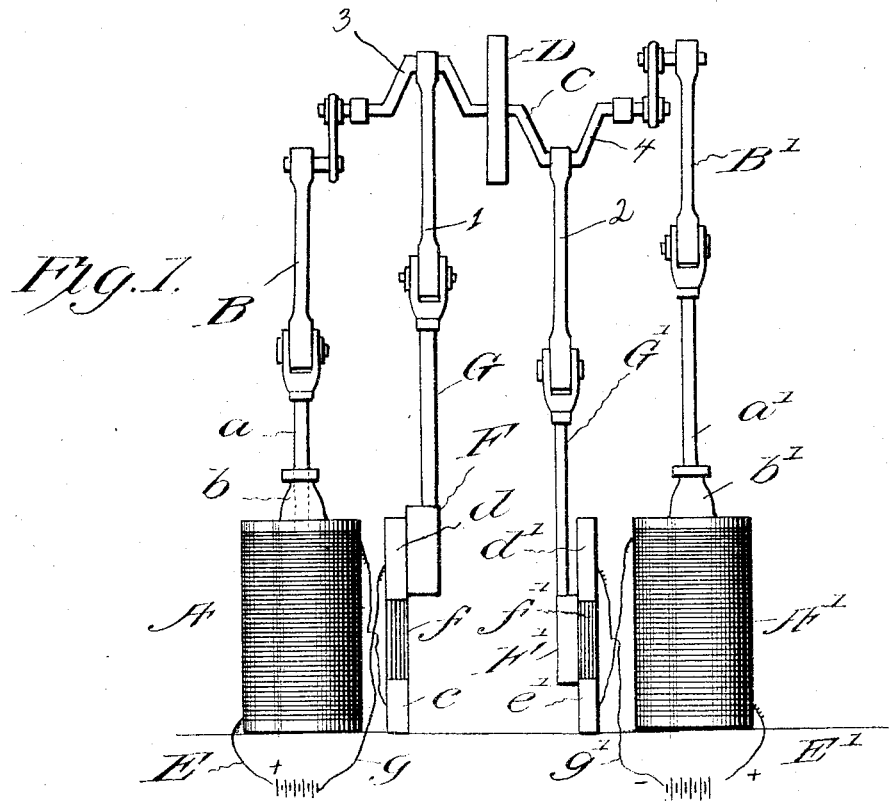
Figure 2:
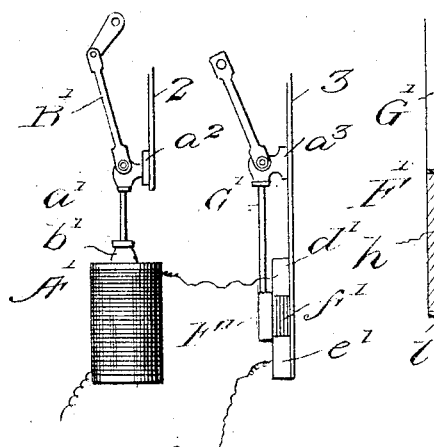
Figure 3:
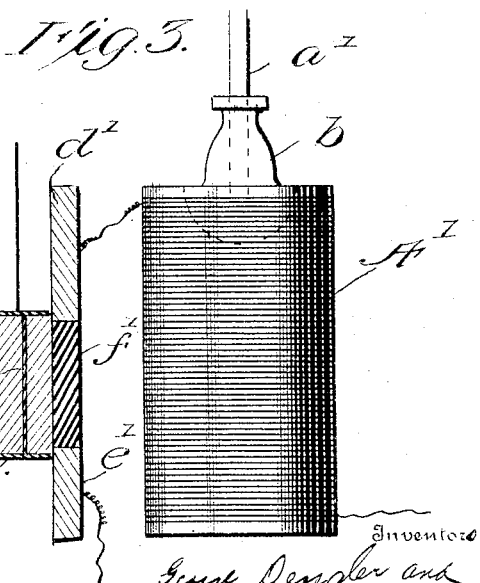

Figure 1 is a view in elevation, showing the motor in operative position. Fig. 2 is a side elevation thereof. Fig. 3 is a detail view showing the contacts.

In the drawings, A and A' indicate the solenoid-coils, and $a$ and $a'$ the cores thereof, which extend through suitable guides $b$ and $b'$, the outer ends of the said cores being connected to pitmen B and B', and the pitmen in turn are connected to the crank-shaft C. The outer ends of the cores carry slides $a^2$ $a^3$, which bear against suitable guide-plates 2 and 3 in order that they may be held in proper alinement. The crank-shaft has a power-wheel D, which may be connected to any suitable machinery to be driven; but as this latter feature forms no part of the invention it will not be described in detail.

The solenoid-coils are connected through the conductors E and E' with any suitable source of electricity, which may be in the nature of cells, charging-boxes, or direct-current dynamos, and the windings of the coils are then connected to suitable terminal contacts $e$ and $e'$, respectively, which contacts are insulated from companion contacts $d$ and $d'$, respectively, the insulation being indicated by the reference-letters $f$ and $f'$. The contacts $d$ and $d'$ have conductors $g$ and $g'$, respectively, which form the return for the current when the contacts $d'$ and $e'$ are bridged by the sliding contacts F and F'. The sliding contacts F and F' are suitably insulated from the bars G and G' by a mica film $h$, as shown in Fig. 3, and the said bars G and G' are connected to the contact by means of non-conducting attachments $i$. The bars G G' are connected to the pitmen 1 and 2, which in turn are connected to the crank-hangers 3 4, formed on the shaft C, to either side of the power-wheel D.

In operation the coil A, with the parts in the position shown in Fig. 1, would be demagnetized, while the coil A' would be energized, causing the core $a'$ to be drawn within the coil, and thereby causing the pitman B' to operate in turning the crank-shaft, which movement would result in drawing the contact F' outwardly and causing a break in the circuit between the terminals $d'$ and $e'$. The movement of the crank-shaft will effect a break between the terminals $d'$ and $e'$, and this same movement would result in bringing the contact F into engagement with both of the terminals $d$ and $e$, thereby establishing a circuit through the coil A. As the solenoid $a$ will have been drawn to its outward limit through the motion of the crank-shaft, it is then in position to be acted on by the energized coil A, and it would in turn be drawn within the coil. This movement would give further rotation to the crank-shaft, and as the coil A would then be demagnetized the coil A' would be energized, and the rotation of the crank-shaft would continue so long as the current was supplied in the manner stated.

From the foregoing description the construction, operation, and advantages will, it is thought, be understood, it being noted that various changes may be resorted to in the proportions and details of construction for successfully carrying the invention into practice without departing from the scope thereof.

Having fully described the invention, what we claim as new, and wish to secure by Letters Patent, is—

In an electric motor, solenoid-coils, suitable conductors extending to sources of electricity, conductors leading from the coils, terminals or contacts with which the conductors are in contact, the said terminals of each coil being insulated from each other, conductors leading from the coil to one of the terminals and from the other terminal to the source of electricity, a crank-shaft arranged above the coil and provided with crank-hangers, solenoid-cores movable in the coils and connected to the crank-shaft, guides on the coils through which the cores pass, guide-plates, slides carried by the cores and engaging the guide-plates, bars connected to the crank-hangers, suitable contact-plates on the bars adapted to bridge the terminals and suitable power-transmitting means carried by the crank-shaft, the relation of the crank-shaft and crank-hangers being such as to cause the contact-plates of the bars to alternately bridge the terminals.

In testimony whereof we affix our signatures, in the presence of two witnesses, this 30th day of August, 1904.

GEORGE DENGLER.
IDA W. SCHMIDT.

Witnesses:
EDWARD E. KANE,
JAMES D. JEROME.